United States Patent
Clément et al.

(10) Patent No.: US 10,732,022 B2
(45) Date of Patent: Aug. 4, 2020

(54) SYSTEM AND METHOD FOR REAL-TIME MANAGEMENT OF LIQUID BOTTLES CONTENT IN A BAR OR THE LIKE

(71) Applicant: Apéros Systèmes Inc., Longueuil (CA)

(72) Inventors: Gilles Clément, Eastman (CA); François Hébert, Mont St-Hilaire (CA); Mathieu Beaupré, Sherbrooke (CA); Michel Corriveau, St-Denis-de-Brompton (CA)

(73) Assignee: Apéros Systèmes Inc., Longueuil, Qc (CA)

( * ) Notice: Subject to any disclaimer, the term of this patent is extended or adjusted under 35 U.S.C. 154(b) by 16 days.

(21) Appl. No.: 16/084,711

(22) PCT Filed: Mar. 14, 2017

(86) PCT No.: PCT/CA2017/000058
§ 371 (c)(1),
(2) Date: Sep. 13, 2018

(87) PCT Pub. No.: WO2017/156619
PCT Pub. Date: Sep. 21, 2017

(65) Prior Publication Data
US 2019/0072424 A1 Mar. 7, 2019

Related U.S. Application Data

(60) Provisional application No. 62/309,686, filed on Mar. 17, 2016.

(51) Int. Cl.
*G01G 17/04* (2006.01)
*G01G 19/00* (2006.01)
(Continued)

(52) U.S. Cl.
CPC .............. *G01G 17/04* (2013.01); *G01G 3/12* (2013.01); *G01G 3/1402* (2013.01); *G01G 19/00* (2013.01); *G06Q 10/087* (2013.01); *G06Q 50/12* (2013.01)

(58) Field of Classification Search
CPC .................................................... B67D 1/0041
See application file for complete search history.

(56) References Cited

U.S. PATENT DOCUMENTS 4,961,533 A * 10/1990 Teller ................... B67D 1/06
177/25.19
4,992,775 A * 2/1991 Castle .................. G08B 25/10
177/132
(Continued)

FOREIGN PATENT DOCUMENTS

CA 2067096 3/1991
CA 2531849 1/2005
(Continued)

*Primary Examiner* — Jessica Cahill
*Assistant Examiner* — Christopher M Afful
(74) *Attorney, Agent, or Firm* — Agence de Brevets Fournier

(57) ABSTRACT

A system and method for real-time management of liquid bottles contents in a restauration establishment includes a controller and at least one bottle support base coupled to the controller. Each bottle support base includes a bottle-receiving surface, a first sensor that produces a first signal indicative of a weight of a bottle deposited on the surface; a second sensor for reading an identification element on the bottle and for producing a second signal indicative thereof; and a transmitter for transmitting to the controller data indicative of the first and second signal. The controller implements numerous functionalities that are derived from its assessment of the volumes of alcohol in the bottles using the data received from the support bases.

11 Claims, 12 Drawing Sheets

(51) Int. Cl.
*G01G 3/12* (2006.01)
*G01G 3/14* (2006.01)
*G06Q 50/12* (2012.01)
*G06Q 10/08* (2012.01)

(56) References Cited

U.S. PATENT DOCUMENTS

| | | | |
|---|---|---|---|
| 9,488,549 B2 | 11/2016 | Reitmeier | |
| 2003/0010543 A1* | 1/2003 | Montagnino | G01G 19/44 |
| | | | 177/177 |
| 2008/0082360 A1* | 4/2008 | Bailey | G06Q 10/06 |
| | | | 705/2 |

FOREIGN PATENT DOCUMENTS

| | | |
|---|---|---|
| CA | 2664667 | 4/2008 |
| CA | 2874545 | 11/2013 |
| GB | 2529906 | 3/2016 |
| WO | PCT/CA2017/000058 | 6/2017 |
| WO | PCT/CA2017/000058 | 6/2018 |

* cited by examiner

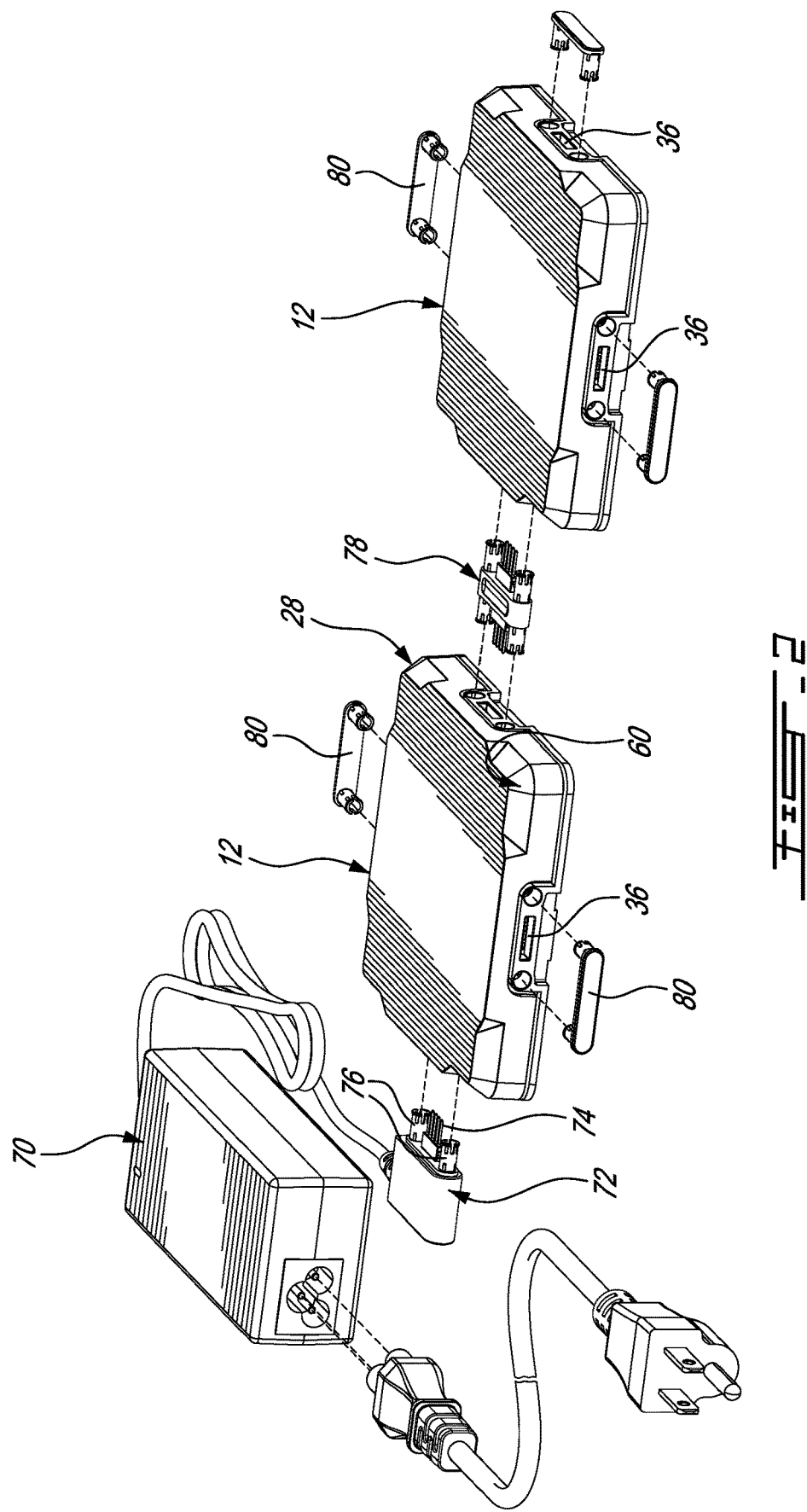

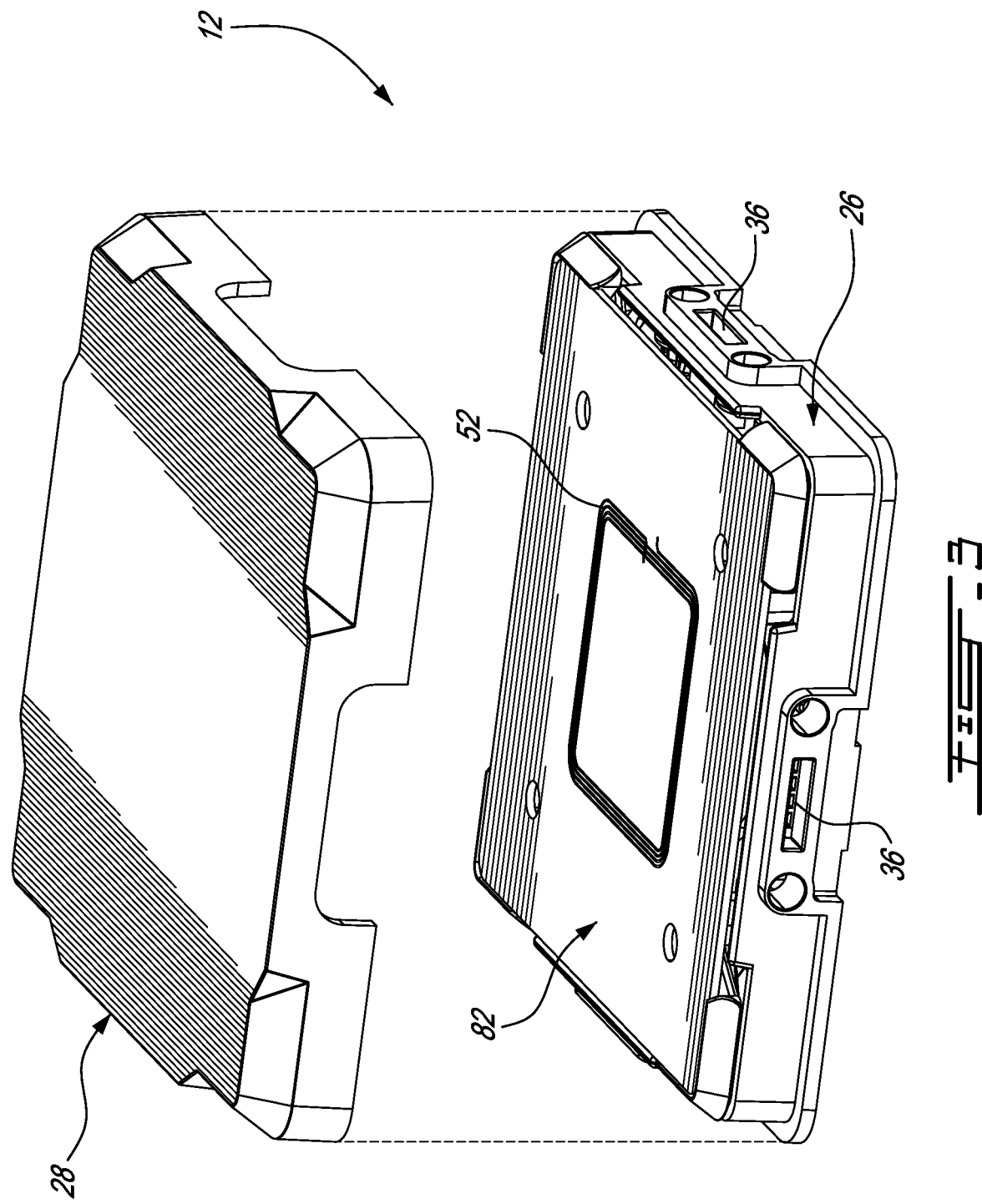

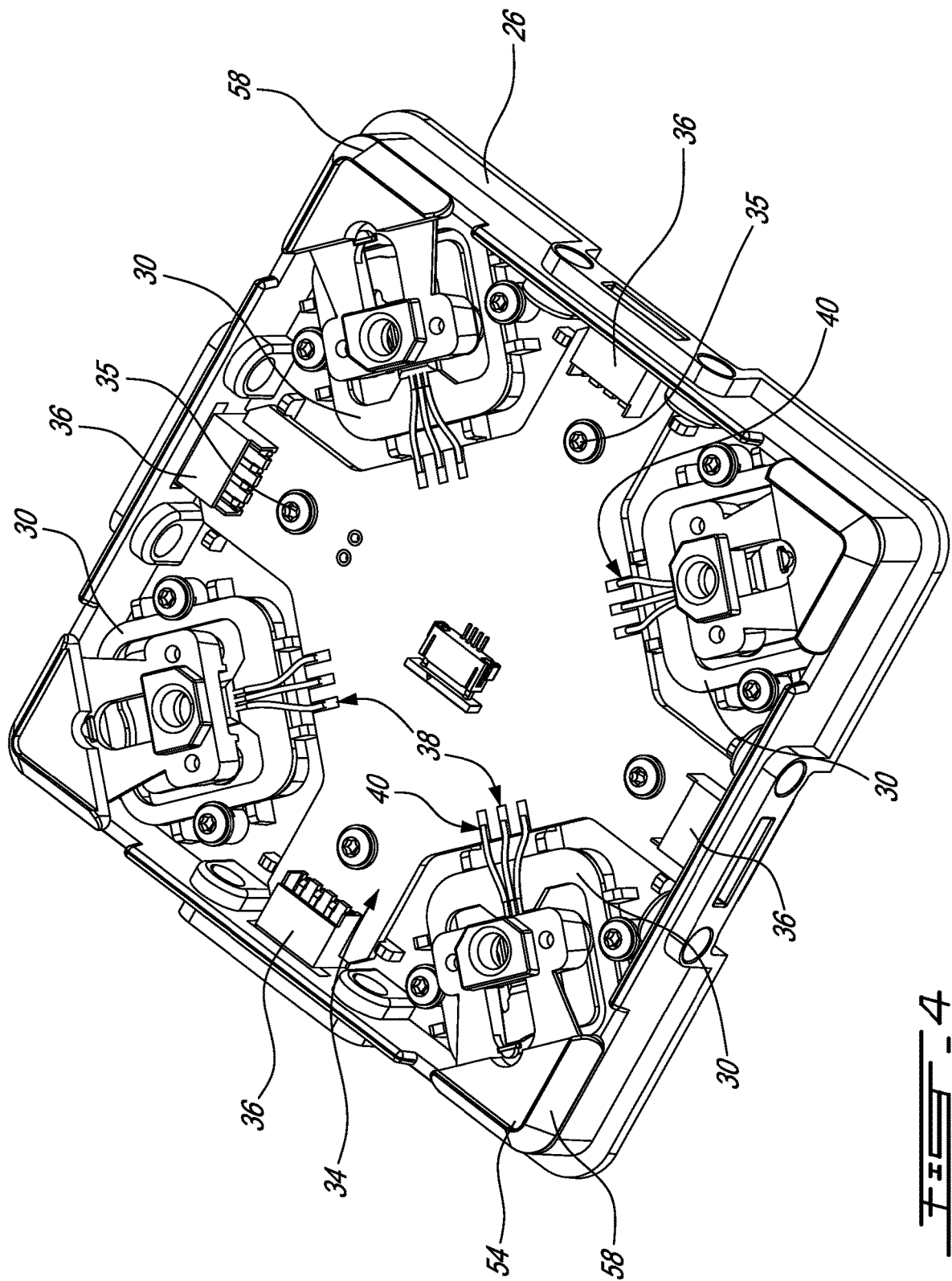

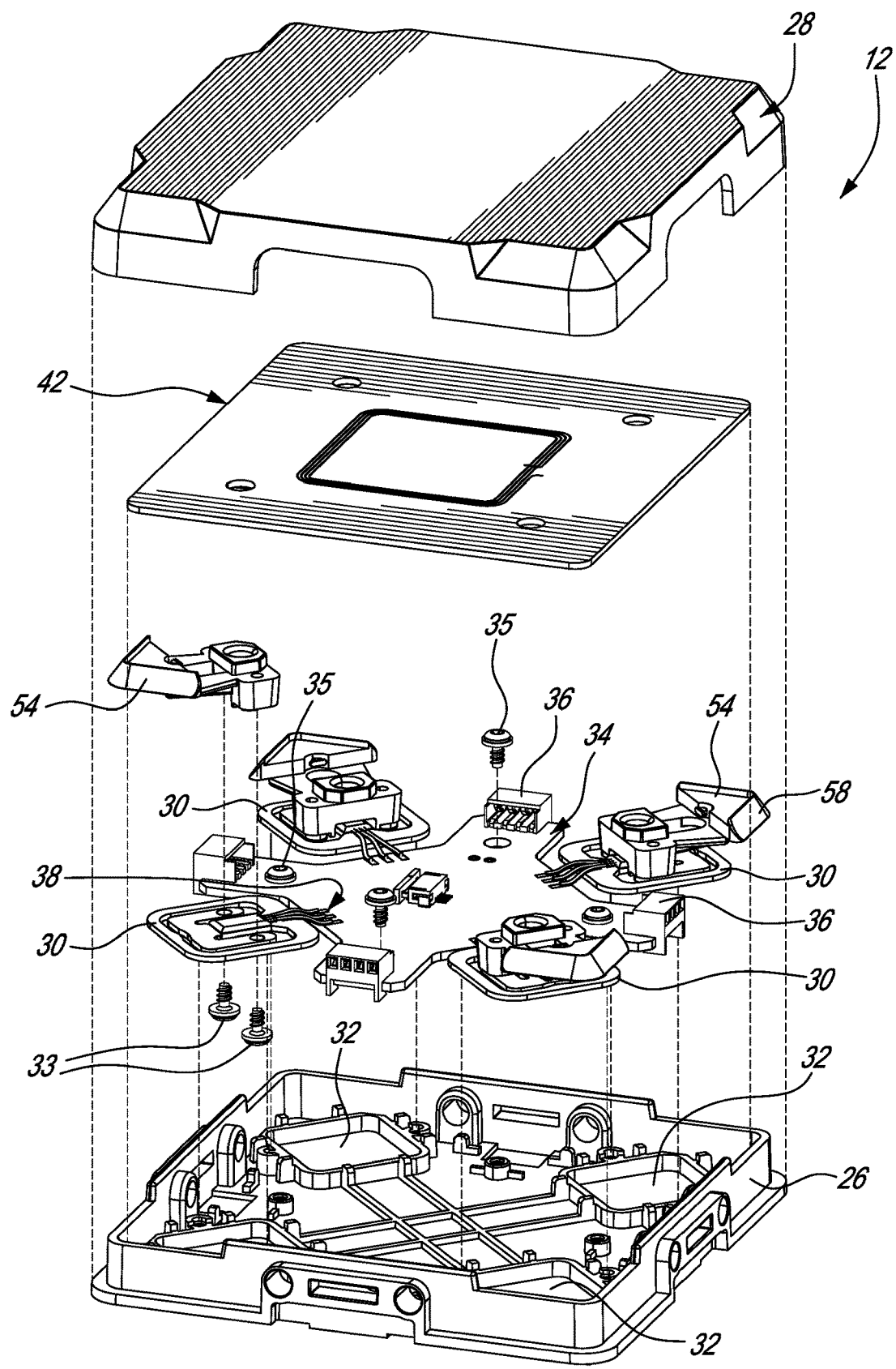

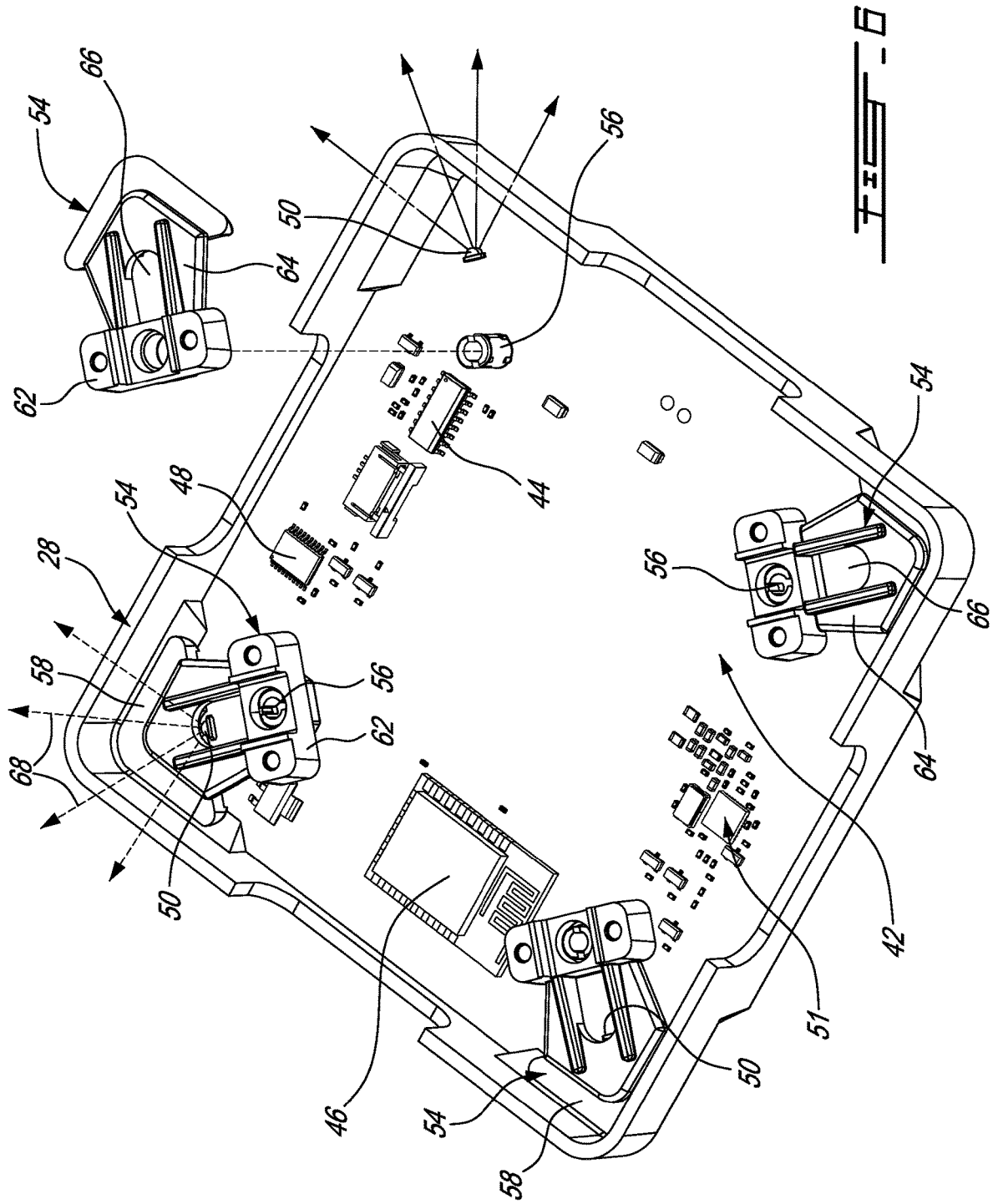

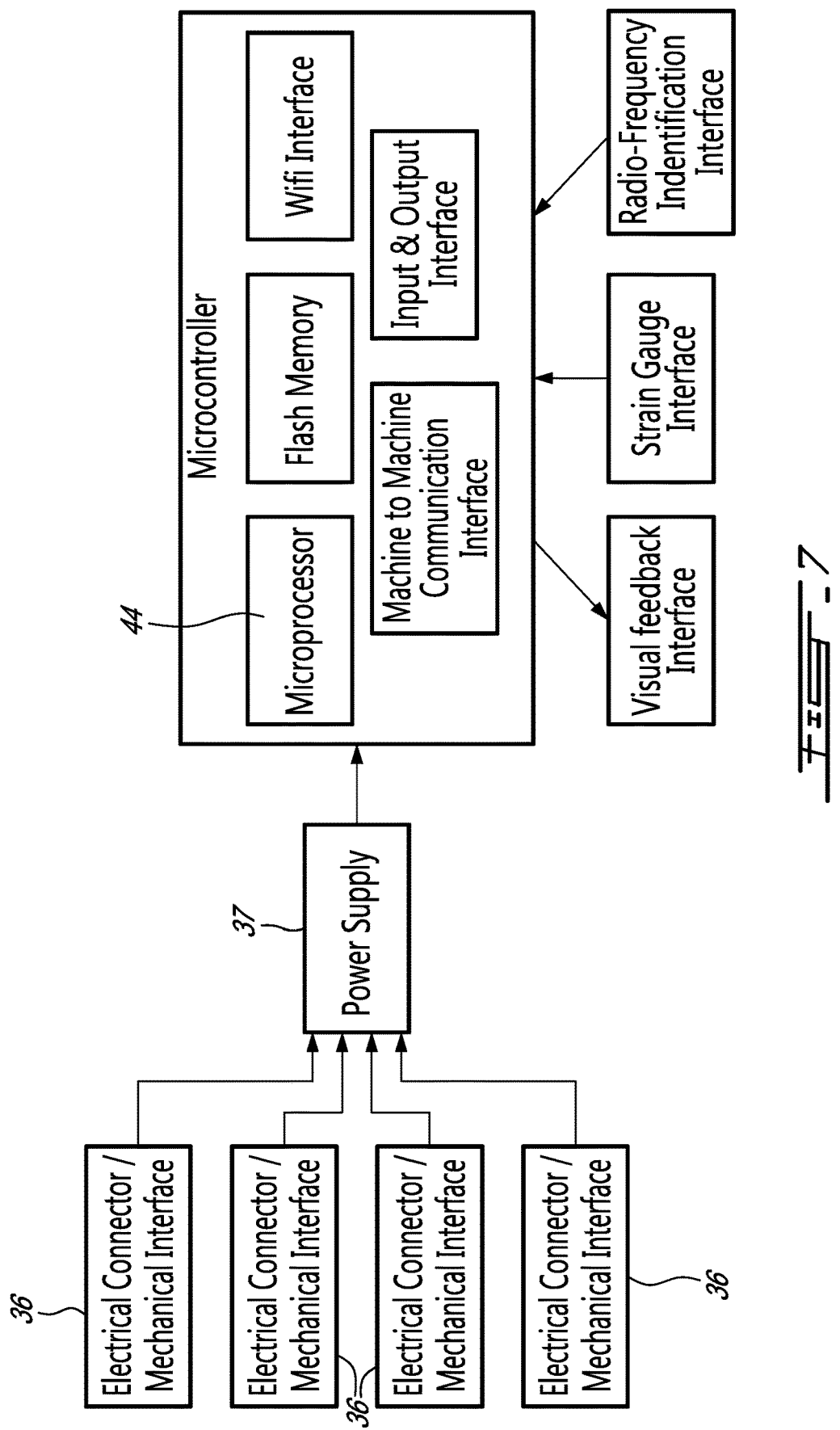

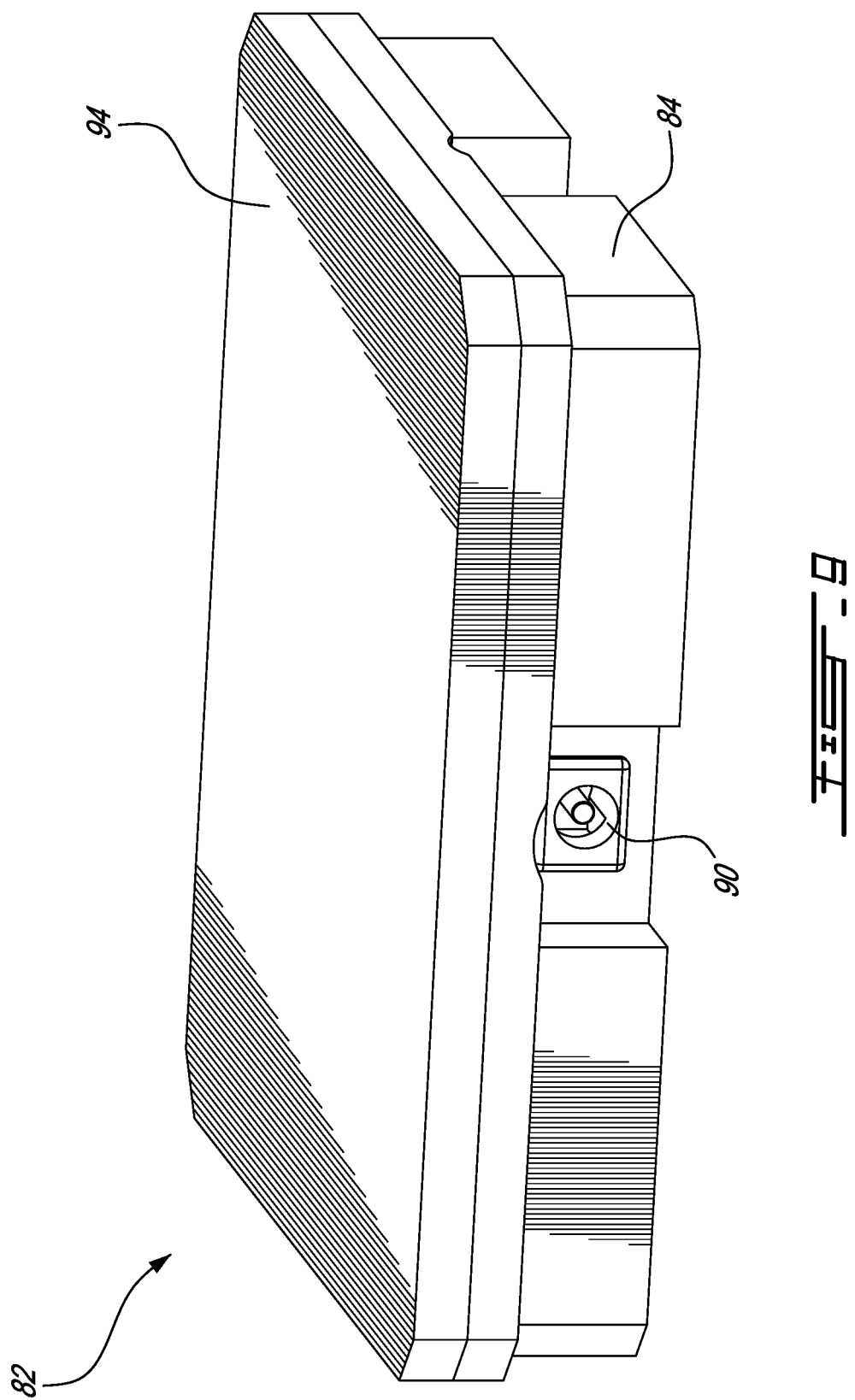

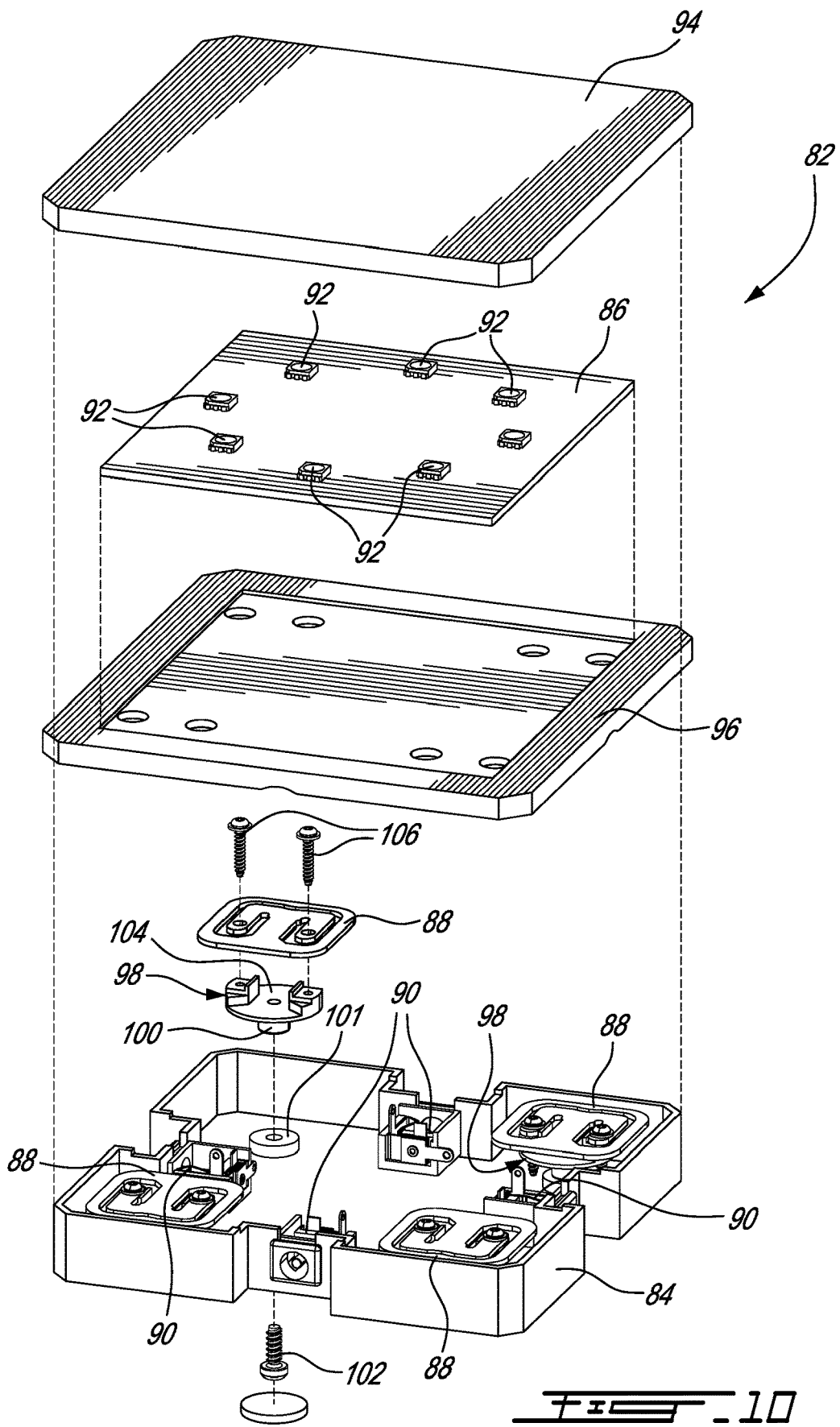

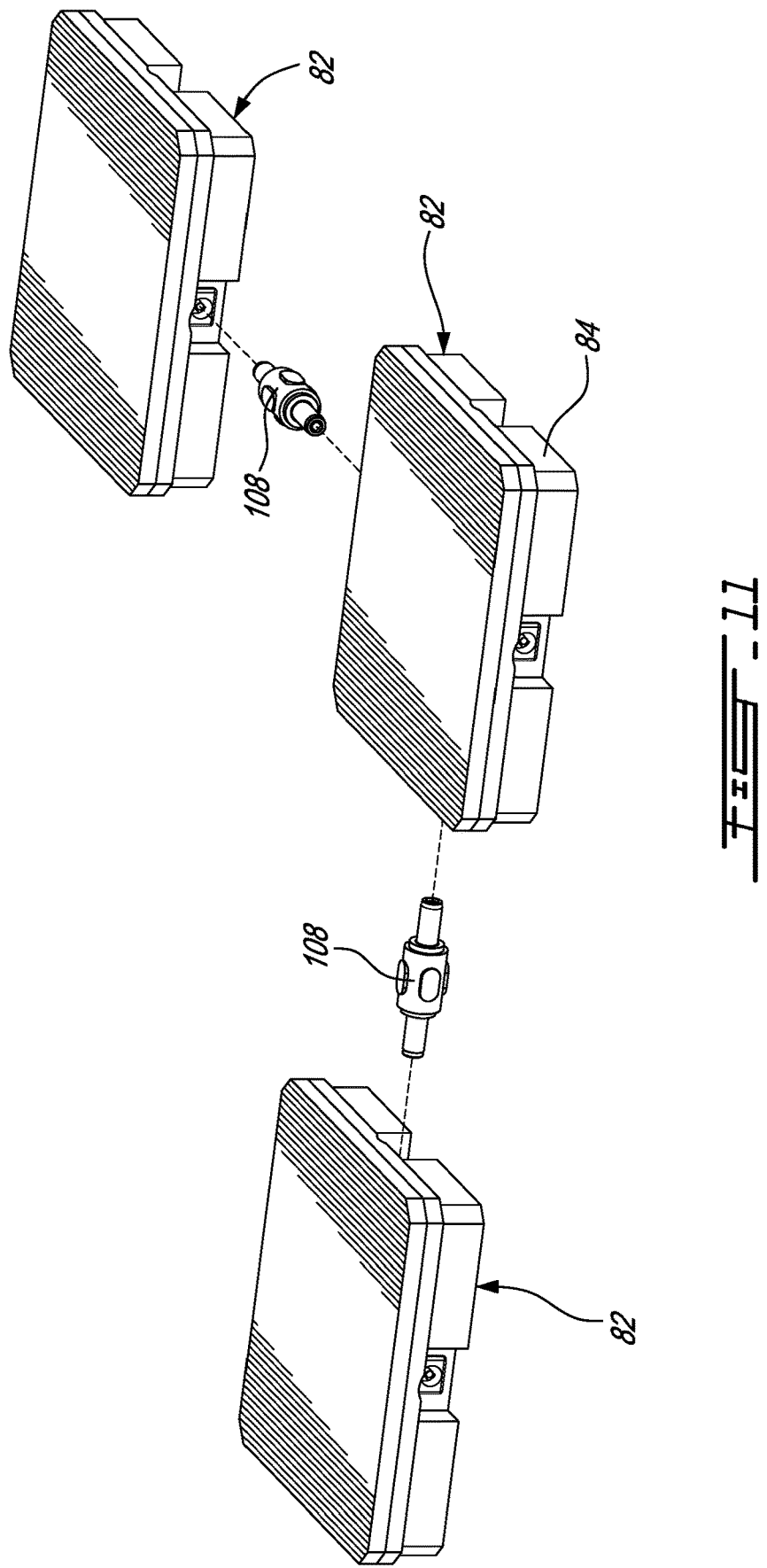

SYSTEM AND METHOD FOR REAL-TIME MANAGEMENT OF LIQUID BOTTLES CONTENT IN A BAR OR THE LIKE

FOREIGN PRIORITY CLAIM

This is a 35 U.S.C. § 371 application of, and claims priority to, International Application No. PCT/CA2017/000058, which was filed on Mar. 14, 2017, and published as Publication No. WO 2017/156619A1, which claims priority to U.S. Provisional patent application No. U.S. 62/309,686, which was filed on Mar. 17, 2016, the entirety of all the applications are incorporated herein by reference.

FIELD

The present disclosure relates to management of inventories. More specifically, the present disclosure relates to a system and method for the management of the content of liquid bottles in a bar or the like.

BACKGROUND

It is well-known that over pouring, mistakes and thefts represent a significant economic drain for bars and restaurants. For the hospitality industry, controlling bartender's activities is key to profitability, but it also represents important management challenges considering the following:
- bartenders typically prepare several hundred drinks and cocktail per work shift;
- each drink or cocktail is prepared using a small quantity of alcohol;
- cocktail recipes are made from different alcoholic ingredients. A bar has typically an inventory of 150 different types, brands and makes of alcoholic beverages in order to accomplish the most frequent drink and cocktail recipes;
- bartending is a stressful activity. Drinks and cocktails orders arrive at a fast pace, changes happen frequently, decisions must be made in split seconds, and preparations of cocktails must be performed as quickly as possible.

Processing of such a large amount of data in real-time is way beyond anyone's brain's capacity.

A computerized system and electronic sensors capable of achieving real-time measurement of alcohol poured by bartenders, from any bottle, of providing managers enough information to detect over pouring, mistakes or thefts, and of keeping a real-time inventory of alcohol bottle's content is thus desirable.

SUMMARY

The real-time measurement of alcohol dispensed in an establishment is achieved by providing at least one bottle support base that identifies a bottle receives thereon, that determines the weight of the bottle and that sends data indicative of both the weight and identity of the bottle to a controller coupled to the at least one bottle support base.

According to an illustrative embodiment, there is provided a bottle support base that comprises:
- a bottle-receiving surface;
- a first sensor coupled to the bottle-receiving surface that produces a first signal indicative of a weight of a bottle deposited on the surface;
- a second sensor for reading an identification element on the bottle and for producing a second signal indicative thereof; and
- a transmitter for transmitting data indicative of the first and second signal.

According to another illustrative embodiment, there is provided a system for real-time management of liquid bottles contents in a restauration establishment, the system comprising:
- a controller; and
- at least one the bottle support base as recited hereinabove that is coupled to the controller.

According to still another illustrative embodiment, there is provided a method for real-time management of the contents of liquid bottles in a restauration establishment, the method comprising:
- weighing each of the bottles after each use thereof by depositing each of the bottles on one of a plurality of support base that further reads an identification element on said each of the bottles;
- the one of a plurality of support bases sending to a controller data indicative of the identification element and of the weight of the bottle.

It is to be noted that the expression "real-time" should be construed in the description and in the claims as a processing mode in which data are processed immediately upon receipt, minimizing the response time between entry of the data and the result.

Other objects, advantages and features of the bottle support base and of the system and method for a system for real-time management of liquid bottles contents in a restauration establishment will become more apparent upon reading the following non-restrictive description of preferred embodiments thereof, given by way of example only with reference to the accompanying drawings.

BRIEF DESCRIPTION OF THE DRAWINGS

In the appended drawings:

FIG. 2 is a perspective view of two bottle weighing scales (BWS) from FIG. 1, shown along with a power transformer and an interconnector;

FIG. 3 is a perspective view of one of the BWS from FIG. 2, shown with its cover removed;

FIG. 4 is a perspective view of the BWS from FIG. 3, having both its cover and top printed circuit board (PCB) removed;

FIG. 5 is an exploded view of the BWS from FIG. 2;

FIG. 6 is a bottom perspective partly exploded view of the cover of the BWS from FIG. 2, shown with the top PCB mounted therein; and FIG. 7 is a schematic view of the electronics that are parts of the BWS from FIG. 2;

FIG. 9 is a perspective of a BWS according to a second illustrative embodiment;

FIG. 10 is an exploded view of the BWS from FIG. 9; and

FIG. 11 is a perspective view showing the interconnection of three BWS from FIG. 10.

DETAILED DESCRIPTION

Figure 1:
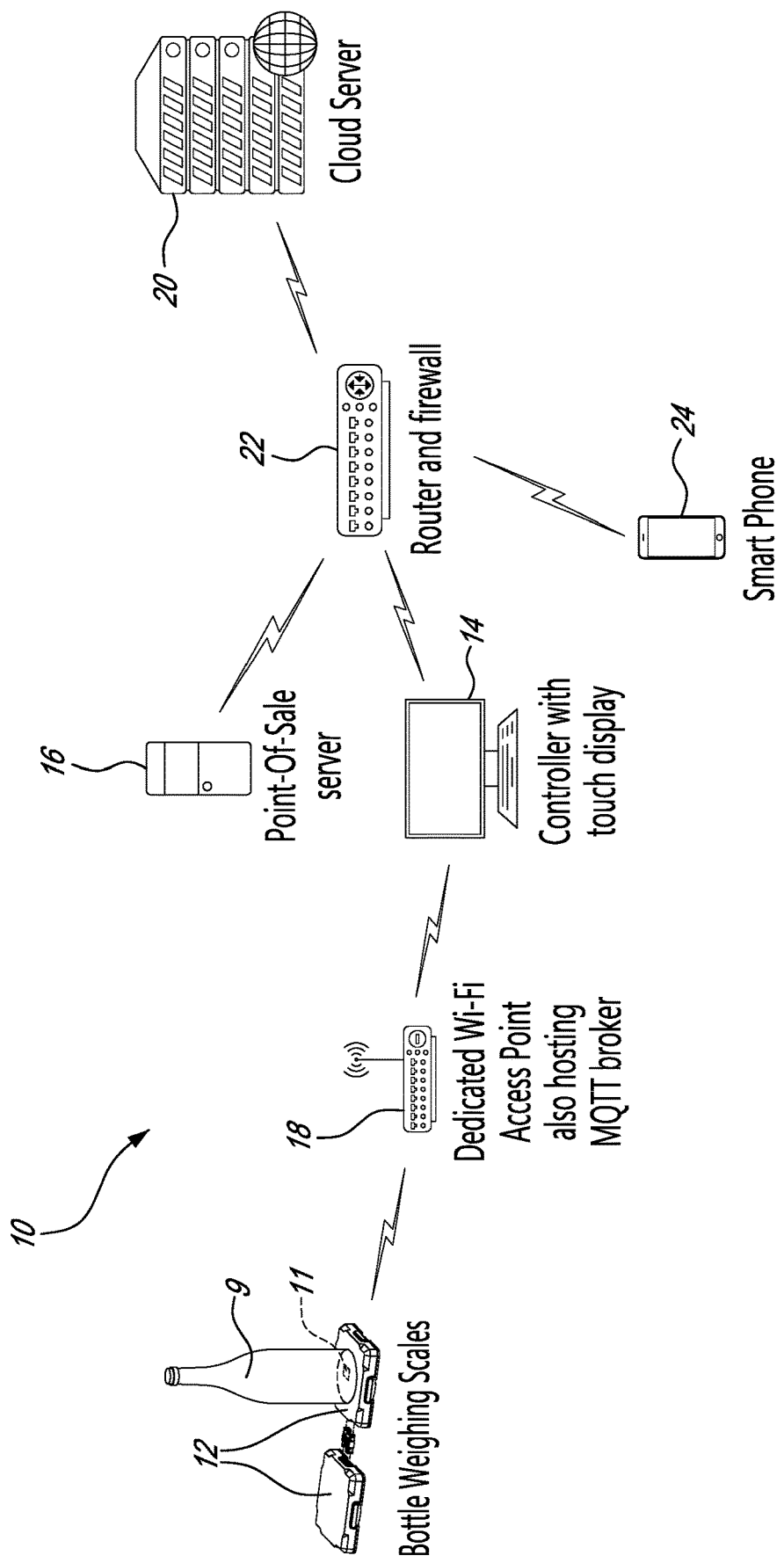
FIG. 1 is a schematic view of a system for real-time management of liquid bottles content according to a first illustrative embodiment.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

An illustrative embodiment of a system 10 for real-time management of liquid bottles contents in a bar will now be described with reference to FIG. 1.

As will become more apparent upon reading the following description, the system 10 is not limited to manage bottles of alcohol. It can be used to monitor bottles or any containers that includes a liquid, a fluid, a granular or a powder material having a uniform density.

The system 10 comprises a network of bottle support bases 12 that are coupled to a controller 14, and near field communication (NFC) sticker tags 11, each apposed on a respective bottle 9 to monitor and manage in the bar, to uniquely identify each bottle 9.

The implementation of the system 10 in a bar is used for illustrative purposes only. The system 10 can be implemented in any restauration establishment including without limitation a bar, a restaurant, a hotel, etc.

As will be described hereinbelow in more detail, the bottle support bases 12 includes a weighing scale that allows determining in real-time the volume of alcohol poured from bottles by bartenders (not shown). The bottle support bases 12, which will also be referred to herein as Bottle-Weighing Scale (BWS), are connected to a Point-Of-Sale (POS) server 16 via the controller 14.

More specifically, the BWSs 12 are coupled to the controller 14 via a private Wi-Fi access point 18. Data is exchanged between the BWSs 12 and the controller 14 using the MQTT (Message Queue Telemetry Transport) protocol. For that purpose, the Wi-Fi access point 18 hosts a MQTT broker software. Messages coming to the controller 14 are also relayed to a cloud server 20 via a router 22 for long term storage and analysis. Drink/cocktail order-related data is pushed to the controller 14 by the POS server 16. The system 10 allows real-time inventory data to be obtained using either a touch screen display directly connected to the controller 12 or using a Wi-Fi connected smart phone or tablet 24 via a dedicated application. The smart phone 24 connects to the system 10 either via the dedicated Wi-Fi access point 18 or via the router 22. The router 24 is further used to connect the controller 14 to the POS server 16.

A software is implemented on the controller 14 which processes data coming from the BWSs 12 and 16 POS system. The controller 14 receives and processes MQTT messages, calculates volume poured from all bottles, saves all detected pour in a log, and thus keeps a real-time inventory of all alcohol bottles used in the bar. Simultaneously, it receives and processes drink/cocktail order-related data from the POS system 16 and saves those in an order log.

According to another embodiment (not shown), the message broker is implement on the controller 14.

The controller 14 is further programmed to detect anomalies and alerts bartenders and managers accordingly by comparing, over time, the log of pour to the log of orders. It is also programmed to produce real-time bartender's metrics about quality of service, accuracy, productivity and efficiency.

According to the first illustrative embodiment, the controller 14 runs on a computer equipped, for example, with a touch-screen display to allow interaction with bartenders. The controller 14 is further programmed to implement for example the following functionalities which can be accessed and managed via the touch screen:

over-pouring alerts, bottle disappearance alerts, bottle about to be finished alerts, display real-time bartender KPI (Key Performance Index), display active orders ages, display cocktail recipe for any active order, displays statistics about bartender's pour accuracy, display inventory status for any alcohol bottle type & brand, etc.

These functionalities of the system 10 are derived from the controller 14 assessing the volumes of alcohol in the bottles 9 from the data received from the BWSs 12. The controller 14 further keeps a database of alcoholic products type used in the bar. This database stores for example the product type, the bottle weight when it's full, the weight when it's empty, the total volume and the alcohol content density.

In order to achieve interoperability between the large variety of commercial POS products available on the market, the controller 14 is further configured to act as if it was a virtual POS printer driver relative to the POS server 16. The POS server 16 sends its data to the controller 14 as if it was a printer and, when the controller 14 receives data from the POS server 16, the controller 14 performs a syntaxical and semantic analysis of the message received to extract relevant order details data such as date, time, order items, quantities, etc.

According to another embodiment, the controller 14 is configured to act as a conventional client relative to the server 16.

According to still another embodiment, the bar controller 14 and POS server 16 are embedded in a single device providing all the above-described functionalities of the controller 14 and POS server 16.

Also, while the system 10 is described as having devices interconnected via a wireless network, some or all of the devices 12-22 can also be interconnected with wires.

According to another embodiment, the connection of the system 10 to a cloud server 20 is omitted. According to still another embodiment, the system 10 includes a connection to a non-proprietary cloud.

The system 10 is not limited to the BWSs 12 communicating to the controller 14 using the MQTT protocol, and other communication protocols can be implemented.

With references to FIGS. 2 to 6, a bottle-weighing scale 12 will now be described in more detail.

The BWSs 12 are used to measure the weight of any bottle 9 thereon at any given point in time. Each BWS 12 is configured with the following functionalities:

detecting when a bottle 9 is placed thereon on;
measuring the weight of the bottle;
reading the bottle's unique identity from the NFC tag;
transferring data indicative of the bottle weight and identity to the controller 14 over the Wi-Fi network, using the MQTT (Message Queuing Telemetry Transport) protocol;

detecting when a bottle 9 is removed thereon and sending a MQTT message indicative thereof to the controller 14.

It results from the above that the network of BWS 12 in the bar allows determining the volume of alcohol (or of any uniform density liquid) poured at a given point in time, no matter which BWS 12 is used.

Each BWS 12 includes a generally rectangular waterproof casing having a receptacle 26 and a removable cover 28 mounted onto the receptacle 26 that defines a bottle-receiving surface. The receptacle 26 includes four (4) housings 32 located in its four corners, each receiving an electronic strain gauge 30 therein. The exterior portion of each strain gauges 30 is secured in the housings via fasteners (not shown).

Each BWS 12 further includes a first electronic printed circuit board (PCB) 34 secured to the receptacle 26 therein by fasteners 35 and including four (4) electric supply female connectors 36, a power supply (not shown) and four (4) strain gauge connecting pads 38 that are connected in series to the power supply that connectively receive the strain gauge terminals 40.

The BWSs 12 also include a second electronic PCB 42, that is connected to the first PCB 34 via a four (4)-way ribbon cable that allows transmitting strain gauge signals from the strain gauges 30 and two wires dedicated to power supply. The second PCB 42 includes a module 46 including both a micro-processor and a 802.11g data transmitter, an analog to digital converter and amplifier 48 to read signals from the strain gauges 30, four(4) independent RGB Light-Emitting Diodes (LED) 50 (only three shown), a four (4) channel pulse width modulation RGD LED driver 44 that control the LEDS 50, and a near-field communication (NFC) RFID (radio frequency identification) reader 51 and antennae 52.

Each BWS 12 further includes four (4) transparent arrow-shaped acrylic light pipes 54 that are secured to the second PCB 42 via a respective snap-in stem 56 that extends from the second PCB 52 on the side of the LEDs 50. The light pipe 54 is further attached to the W-shaped center portion of a respective strain gauge 30 via fasteners 33. The light pipes 54 are so shaped and positioned relative to the LEDs 50 in the casing that a respective LED 50 projects its light towards and through the light pipe 54 and then through a respective corner 60 of the cover 28. For that purpose, the cover 28 is made of a semi-transparent acrylic material that allow light to pass through it when the light source is positioned directly on its surface.

More specifically, each light pipe 54 includes a mounting portion 62 that includes holes for receiving a respective stem 56, a V-shaped portion 58 that is distanced from the mounting portion 62 by a bridge portion 64. The bridge portion includes a LED-receiving aperture 66. The relative position of the light-pipe 54 and the LED 50 causes the light emitted from the LED 50 to be projected through the V-shaped portion 58 and then through the corner 60 of the cover (see arrows 68).

The arrangement of the LEDs 50, light-pipes 54 and cover 28 allows selectively lightning the four corner of the BWS 12 so as to provide visual feedbacks to users and customers (both not shown).

The light pipes 54 further operatively couple the cover 28 to the four (4) strain gauges 30. For that purpose, the V-shaped portion 58 of the light-pipe 54 is shaped for complementary receiving the cover 28 thereon and the mounting portion 62 of the light-pipe 54 rests onto a respective strain gauge 30. The cover 28 is mounted to the receptacle 26 so as to float thereon, thereby allowing strain gauges' deformation when a bottle 9 is deposited onto the BWS 12.

According to another embodiment (not shown), another element or mechanism than the light pipes 54 is used to couple the cover 28 to the strain gauges 30. According to still another embodiment, the light pipes 54 are omitted and the LEDs 50 are so positioned relatively to the cover 28 or receptacle 26 so that their lights are visible therethrough.

With reference more specifically to FIG. 2, each group of interconnected BWSs 50 are electrically supplied by a single transformer 70. The transformer 70 has a male connector 72 that is configured for complementary and operatively coupling with any one of the four (4) female connectors 36 of a BWS 12, one on each of its four (4) side faces. According to the first illustrated embodiment, the male connector 72 has four (4) metal pins 74 that fits into the female connector 36 and two (2) mechanical connectors 76 that yield mechanical stability to the connection.

Two adjacent BWS 12 are interconnected by a male-to-male DC power interconnector 78 having two opposite connecting sides that are similar to the male connector 72 of the transformer 70. BWS interconnectors 78 can be plugged in any of the four (4) female connectors 46. This allows to form any linear or rectangular BWS groups and adapt to various spatial configuration of the bottles 9 in a shelve or else (not shown).

Removable plugs 80 are provided to close unused female connectors 36 for aesthetic and hardware protection purposes.

According to another embodiment (not shown), the BWS 12 includes another type of connectors then connectors 36, 72 and/or 78. The BWS 12 are also not limited to having four connectors 36 (male or female).

The electronic schematics of the BWS 12 is shown in FIG. 7.

Figure 8A:
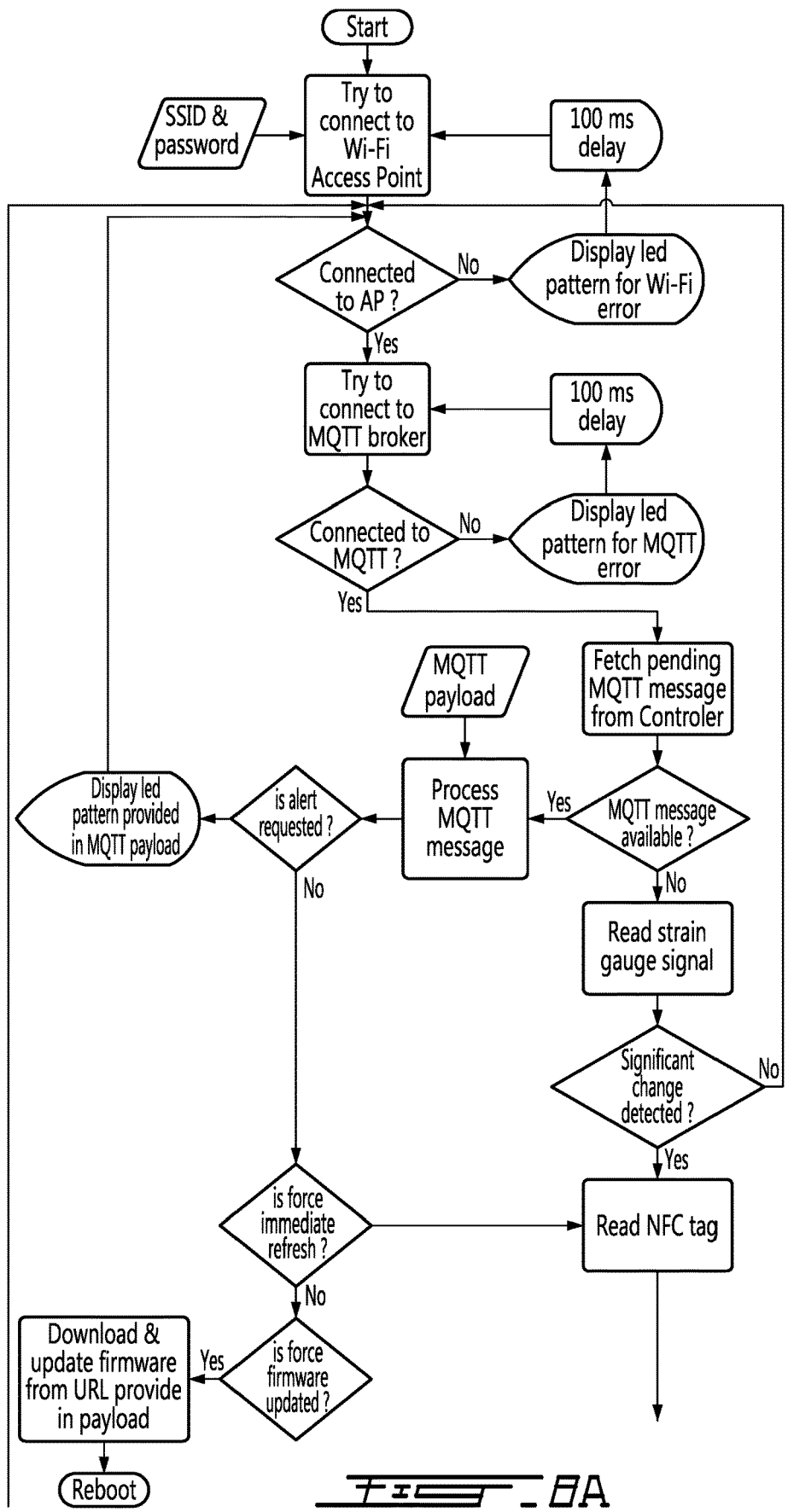
FIGS. 8A-8B are first and second parts of a flowchart of an operational algorithm of a firmware implemented in the micro-processor of the BWS from FIG. 2.
Figure 8B:
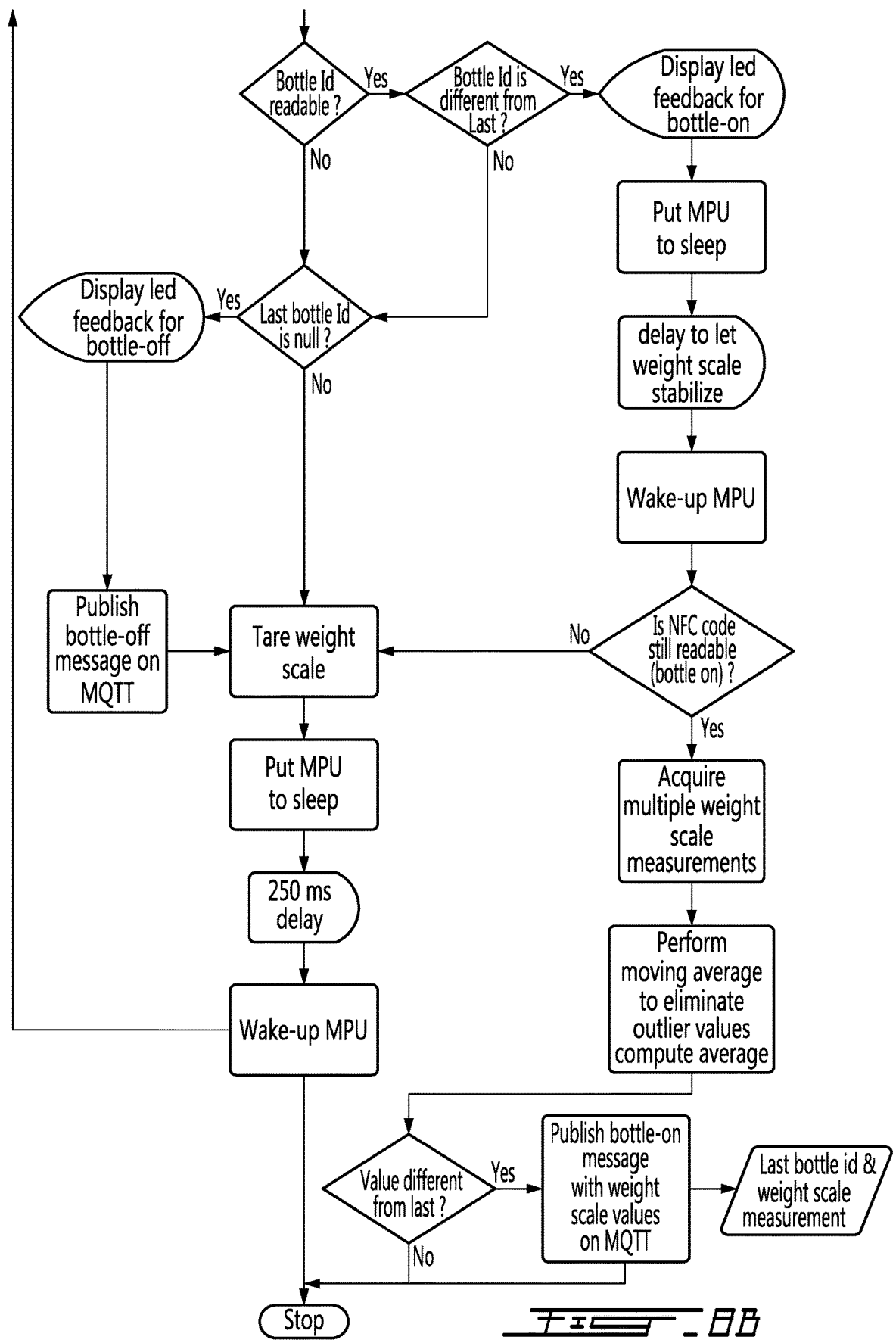

The micro-processor of the BWS 12 is driven by a firmware which implements the algorithm shown in FIG. 8.

Since strain gauges, micro-processors, 802.11g data transmitters, analog to digital converters and amplifiers, LED drivers, near-field communication (NFC) RFID reader and antennae are believed to be well-known in the art, they will not be described herein in more detail for concision purposes.

Further characteristics and features of the system 10 for real-time management of liquid bottles content will become more apparent upon reading the following description of the operation thereof.

Groups of BWS 12 are first organized on the work areas, for example as per usual bottle placement in the bar.

As illustrated in FIG. 2, neighboring BWSs 12 are connected to each other using BWS interconnectors 78 (one per BWS) to form linear or rectangular groups.

One NFC sticker tag 11 is apposed on each or selected bottle 9 entering the bar and managed by the controller system 14 so as to be recognized therefrom via the BWSs 12. According to the first illustrative embodiment, the NFC sticker tags 11 are made of acrylic and are secured to the bottom of the bottles 9 using a glue that can resist to and last in a harsh environment that includes humidity, water and alcohol spills.

According to another embodiment (not shown), each or some of the NFC tags are attached to cords, each to be threaded around a bottle 9.

As described hereinabove, any bottle 9 can be placed on any BWS 12. The bottle location can change from any BWS 12 to any other BWS 12 but a BWS 12 only receives one bottle at a time. For example, the bartender can pick a bottle 9 on a given BWS 12 and later put it down on another free BWS 12.

Every time a bottle 9 is placed or removed from a BWS, a visual feedback is given to the bartender via the BWS LEDs 50.

Every fraction of seconds, the BWS micro-processor 44 reads the string gauge signal through the analog to digital converter 48 to detect if a pressure change occurs. If it does, it tries to find the NFC code of the bottle placed on it via the NFC RFID reader and antennae 52.

If a change occurred since the last measurement cycle, the BWS 12 transmits to the controller 14 a message indicative of the change and displays a visual feedback. A message is also sent to the controller 14 in the case wherein a bottle 9 is no longer detected the BWS 12 after a predetermined period of time.

The controller 14 receives and processes messages coming from the BWS 12. By comparing the negative difference of successive WBS measurements of the same bottle, the controller 14 infers the volume of alcohol recently poured therefrom.

Each NFC tag ID being unique, when an unknown NFC tag is read by one of the BWSs 12, the controller 14 construes this as a new bottle being added to the inventory. The system 10 is configured so that the controller 14 responds by displaying a dialog window requesting the user to scan the new bottle UPC barcode using a laser bar code reader (not shown) connected to the controller. According to another embodiment (not shown), a new bottle is added to the inventory by entering a name or a code or by selecting the new bottle in a menu window displayed by the controller 14.

Simultaneously to the BWSs 12 determining the volume of bottles 9 and communicating information relative thereof to the controller 14, the controller 14 receives orders from the POS server 16.

For every new message coming from either the POS 14 or from any WBS 12, the controller 14 calculates and compares the volume of alcohol that has recently been ordered to the volume of alcohol recently poured and discrepancies are stored and reported.

Under special circumstances, the controller 14 sends message to BWSs 12 to request extra visual feedback. For instance, the controller 14 can force a visual feedback when a bottle is no longer visible on none of the BWS 12, or when an over pour condition is detected, etc.

According to another embodiment (not shown), a system for management of liquid bottles content in a bar includes one or more BWSs 12 that are used to weight all or selected bottles 9 at a predetermined time, for example after the closing of the establishment.

In addition, or alternatively to the control of inventory, the system 10 can be used in other applications such as, without limitations:

- the controller 14 and BWS 12 can be programmed to provide visual feedback to a user preparing a drink or cocktail, so as to indicate thereto the bottles 9 that are required in preparing a specific mixture as ordered. In a bar, wherein more than one bartender are working, a unique color of LEDs can, for example, be associated to each bartender so as to associate a specific visual feedback to a specific bartender;
- the controller 14 and BWSs 12 can be programmed to guide a student bartender during her/his apprenticeship.

A BWS 82 according to a second illustrative embodiment will now be described with references to FIGS. 7 to 11.

Since the BWS 82 is similar to the BWS 12, only the differences therebetween will be described herein for concision purposes.

The BWS 82 comprises a generally rectangular liquid-proof plastic casing 84, a single rectangular electronic printed circuit board (PCB) 86, which includes a micro-processor (not shown), a 802.11g data transmitter (not shown), four (4) electronic strain gauges 88, a near-field communication (NFC) RFID reader and antennae (not shown), four (4) female connectors 90 for electrical supply, a series of LEDs 92 mounted to the PCB 86, an acrylic top 94 which defines a surface for receiving a bottle 9 thereon and for diffusing light coming from the LEDs 92. The PCB 86 is mounted to the casing 84 therein via a plastic holder 96.

Each strain gauge 88 is secured to the casing 84 via an anchoring base 98, which includes i) a stem portion 100 that is secured to the casing in a hole 101 using a fastener 102, and ii) an anchor portion 104 that allows receiving and supporting the strain gauge 88 which is secured thereto via fasteners 106.

The female connectors 90 and male connector and interconnector 108 are DC-type connectors. The power supply (not shown) is of course provided with a similar connector.

It is to be noted that many modifications could be made to the system 10 for real-time management of liquid bottles contents in a bar or to the BWS 12 and 82 described hereinabove and illustrated in the appended drawings. For example:

- the BWS 12 can be configured to communicate with the POS server 16 directly and to determine the volume of alcohol in bottles using inventory information stored in the POS 16. According to such an embodiment, the controller 14 is omitted;
- another communication protocol than the MQTT protocol can be implement for the communications between the BWS 12 and controller 14;
- another communication protocol than the 802.11g protocol can also be used, such as, without limitations, ZigBee;
- even though the present system and method for real-time management of liquid bottles content have been described in the context of a bar, they can also be implemented in a restaurant or the like;
- the LEDs 50 mounted in the casing can be replaced or complemented by other visual feedback elements. According to still another embodiment, the BWS can be free of any feedback elements;
- the number of strain gauges can be different than four (4), can be mounted in the casing differently than illustrated, and are not limited to being positioned at the corners of the casing;
- the system may further include battery powered BWS (or powered by any other autonomous means) that can be easily put on a table, for example to monitor a consumption by volume of a bottle of wine or of another alcohol;
- the system can be configured to recognize tags configured for communications under another RFID protocol than NFC;
- the system is not limited to monitoring alcohol volumes and is suitable for monitoring the volume or weight of any liquid or fluid, in a container, having a substantially constant density;
- interconnectors provided with a cable can also be used for interconnecting two relatively distanced BWS 12 or 82;
- the configuration of the BWSs, including its casing, is not limited to any shape or material. For example, sturdier and bigger metal casings may be provided to receive beer barrels or the likes, allowing controlling the service of draft beer.

Although a system and method for real-time management of liquid bottles content in a bar or the like has been described hereinabove by way of illustrated embodiments thereof, it can be modified. It is therefore to be understood that numerous modifications may be made to the illustrative embodiments and that the scope of the claims should not be limited by the preferred embodiment, but should be given the broadest interpretation consistent with the description as a whole.

What is claimed is:

1. A bottle support base that comprises:
    a bottle-receiving surface,
    at least one first sensor coupled to the bottle-receiving surface that produces a first signal indicative of a weight of a bottle deposited on the surface;
    at least one visual feedback element coupled to the at least one first sensor that produces a visual feedback in response to the first signal; the at least one visual feedback element including at least one light-emitting diode (LED);
    a second sensor for reading an identification element on the bottle and for producing a second signal indicative thereof;
    a transmitter for transmitting data indicative of the first and second signal;
    a power supply and electric supply connectors; wherein the power supply is so configured that a plurality of bottle support bases is interconnectable in a network and a single power transformer is required for energizing the plurality of bottle support bases;
    a waterproof casing including i) a receptacle that houses the at least one first sensor and the second sensor, the transmitter, the power supply and the at least one visual feedback element, and ii) a cover defining the bottle-receiving surface; the casing having at least one portion that allows light from the at least one visual feedback element to be visible through the casing; and
    at least one light-pipe between the waterproof casing and the at least one LED to project the light from the at least one LED towards the at least one portion of the casing that allows the light to be visible through the casing.

2. The bottle support base as recited in claim 1, wherein the at least one first sensor includes at least one strain gauge that is operatively coupled to the bottle-receiving surface.

3. The bottle support base as recited in claim 2, further comprising an analog to digital converter and amplifier connected to the at least one strain gauge for reading and transforming a signal from the at least one strain gauge.

4. The bottle support base as recited in claim 3, wherein the at least one visual feedback element being coupled to the analog to digital converter and amplifier.

5. The bottle support base as recited in claim 1, wherein the second sensor including a radio frequency identification (RFID) reader for detecting a RFID tag attached to the bottle deposited on the surface.

6. The bottle support base as recited in claim 5, wherein the RFID reader is a near-field communication (NFC) type reader.

7. The bottle support base as recited in claim 1, wherein the transmitter is a Wi-Fi data transmitter.

8. The bottle support base as recited in claim 1, wherein the waterproof casing is generally rectangular so as to define four side faces; the electric supply connectors including four electric supply connectors, each one located on a respective one of the four side faces of the casing.

9. The bottle support base as recited in claim 1, wherein the first sensor including at least one strain gauge that is operatively coupled to the bottle-receiving surface; the at least one light-pipe further operatively coupling the at least one strain gauge to the bottle-receiving surface.

10. The bottle support base as recited in claim 9, wherein the waterproof casing is rectangular; the at least one LED including four (4) LEDs, each one located in a respective corner of the casing; the at least one strain gauge including four (4) strain gauges, each being located in a respective corner of the casing; the at least one light-pipe including four (4) light-pipe each being located in a respective corner of the casing.

11. The bottle support base as recited in claim 10, wherein each of the light-pipe includes a first portion that is operatively coupled to a respective strain-gauge, a second portion that projects light from a respective LED through the waterproof casing and a bridge portion that distances the first portion from the second portion and that includes an opening that houses the respective LED.

* * * * *